(12) United States Patent
Fanning

(10) Patent No.: US 7,313,653 B2
(45) Date of Patent: Dec. 25, 2007

(54) METHOD AND APPARATUS FOR OPTIMIZING DATA STREAMING IN A COMPUTER SYSTEM UTILIZING RANDOM ACCESS MEMORY IN A SYSTEM LOGIC DEVICE

(75) Inventor: Blaise B. Fanning, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 7 days.

(21) Appl. No.: 11/326,997

(22) Filed: Jan. 3, 2006

(65) Prior Publication Data

US 2006/0117144 A1 Jun. 1, 2006

Related U.S. Application Data

(63) Continuation of application No. 09/751,602, filed on Dec. 29, 2000, now Pat. No. 7,017,008.

(51) Int. Cl.
*G06F 12/00* (2006.01)
(52) U.S. Cl. .......................... 711/133; 711/149; 711/159
(58) Field of Classification Search ................ 711/133, 711/141, 159
See application file for complete search history.

(56) References Cited

U.S. PATENT DOCUMENTS 4,197,580 A * 4/1980 Chang et al. ............... 711/144
4,414,644 A 11/1983 Tayler
5,790,137 A 8/1998 Derby et al.
6,092,151 A 7/2000 Park
6,122,708 A 9/2000 Faraboschi et al.
6,289,434 B1 * 9/2001 Roy ............................ 712/32

FOREIGN PATENT DOCUMENTS

EP 0062 175 A2 10/1982
EP 0262 301 A2 4/1998

OTHER PUBLICATIONS

German Office Action (translated) for related counterpart German Patent Application 101 97 135.4-53 Applicant: Intel Corporation, recieved Aug. 22, 2006, as sent to Zenz, Helber, Hosbach & Partner, 4 pages.

(Continued)

*Primary Examiner*—Jack A. Lane
(74) *Attorney, Agent, or Firm*—Blakely, Sokoloff, Taylor & Zafman LLP

(57) ABSTRACT

An apparatus and a method for optimizing data streaming in a computer system utilizing random access memory in a system logic device have been presented. In one embodiment, the apparatus includes a processor interface unit and a cache to store information received from a processor coupled to the processor interface unit, the cache to store disposable information that may be overwritten without ever having delivered the disposable information to a system memory if the disposable information has been read at least once, the processor interface unit to receive a disposable information attribute indication from the processor when the processor delivers the disposable information to the processor interface unit.

9 Claims, 2 Drawing Sheets

OTHER PUBLICATIONS

PCT Notification of Transmittal of International Preliminary Examination Report for PCT Appln No. PCT/US01/50414, mailed Sep. 5, 2003 (4 pages).
British Examination Report under Section 18(3) for GB Appln No. GB0317005.7, Date of Report Jun. 25, 2004 (2 pages).
Intellectual Property Office Official Notification for Appln No. 090128727;Date of Issuance Jun. 16, 2004 (2 pages) with English Translation of Official Notification (1 page).
Korean Intellectual Property Office Notice of Preliminary Rejection for Korean Patent Application No. 10-2003-7008822; Date of Issuance Oct. 6, 2005 (3 pages) with English Translation of Official Notification (2 pages).
German Patent Office Action for German Application No. 101 97 135.4-53, dated Aug. 3, 2006, recieved Aug. 22, 2006 (4 pages) wtih English Translation of Office Action (4 pages).
Chinese Patent Office Action for Chinese Patent Application No. 01822943.3; Date of Issuance Jul. 1, 2005 (8pages) with English Translation of Office Action (11 pages).
German Office Action of German Patent Application No. 101 97 135.4-53; the date of mailing: May 31, 2007, (6 pages). Translation of German Office Action of German Patent Application No. 101 97 135.4-53; the date of mailing May 31, 2007, recieved Jun. 25, 2007 (5 pages).

* cited by examiner

METHOD AND APPARATUS FOR
OPTIMIZING DATA STREAMING IN A
COMPUTER SYSTEM UTILIZING RANDOM
ACCESS MEMORY IN A SYSTEM LOGIC
DEVICE

RELATED APPLICATION

This application is a Continuation of the prior application for "METHOD AND APPARATUS FOR OPTIMIZING DATA STREAMING IN A COMPUTER SYSTEM UTILIZING RANDOM ACCESS MEMORY IN A SYSTEM LOGIC DEVICE" filed by Blaise B. Fanning on Dec. 29, 2000 (U.S. patent application Ser. No. 09/751,602 now U.S. Pat. No. 7,017,008).

TECHNICAL FIELD

The present invention pertains to the field of computer systems. More particularly, this invention pertains to the field of optimizing data streaming through a system logic device.

BACKGROUND OF THE INVENTION

Desktop computer systems typically use a graphics controller to display 3D images on a monitor. The graphics controller receives instructions regarding what to draw by driver software running on a processor. The processor and the graphics controller are typically coupled together by a system logic device (often referred to as a "chipset"). For systems that are being used for computer-aided design or for 3D games, the command traffic between the processor and the graphics controller can be considerable. The communication paths between the processor and the graphics controller can often sustain substantially more command bandwidth than if the command traffic is routed through memory, since the memory system must sustain twice the bandwidth in order to transfer the same commands. This is because the commands must be written from the processor into memory and later read back from memory by the graphics controller.

One solution to the limited memory bandwidth problem would be to write command data directly from the processor to the graphics device, eliminating the writes and reads to and from system memory. However, when command data is written directly by the processor to the graphics controller, processor cycles can be lost if the aggregate buffering capacity of the graphics controller and system logic device is consumed. When this happens, the processor is forced to wait for buffer space to clear before it can proceed. Because the graphics driver may need to perform complex calculations and these calculations can be forced to wait for simple command write operations, a substantial waste of processing power is experienced.

If the amount of buffer space in the system logic device were increased, the processor would experience less waiting for buffer space to clear. The system logic device could include a substantial cache that may be used to buffer enough command data so that the commands may be read by the graphics controller directly from the system logic device. However, because the system logic device has no way of knowing whether the data written to the buffers will ever be needed again by the graphics controller or by some other system agent, this solution has the problem of requiring that all of the data written to the buffers also be written out to system memory, thereby negatively impacting overall computer system performance.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

One embodiment of an apparatus for optimizing data streaming in a computer system between a processor and a system component includes a cache in a system logic device that stores disposable information. The term "disposable information" as used herein is defined as information that is meant to be read by a system component only once. That is, "disposable information" does not need to be retained by the computer system once the information has been consumed by a system component. Once a particular cache entry containing disposable information is read by a system component, that cache entry may be overwritten. Because disposable information is meant to be read only once, there is no need for the cache to write the information to system memory before overwriting the cache entry, and system performance is thereby improved.

Figure 1:
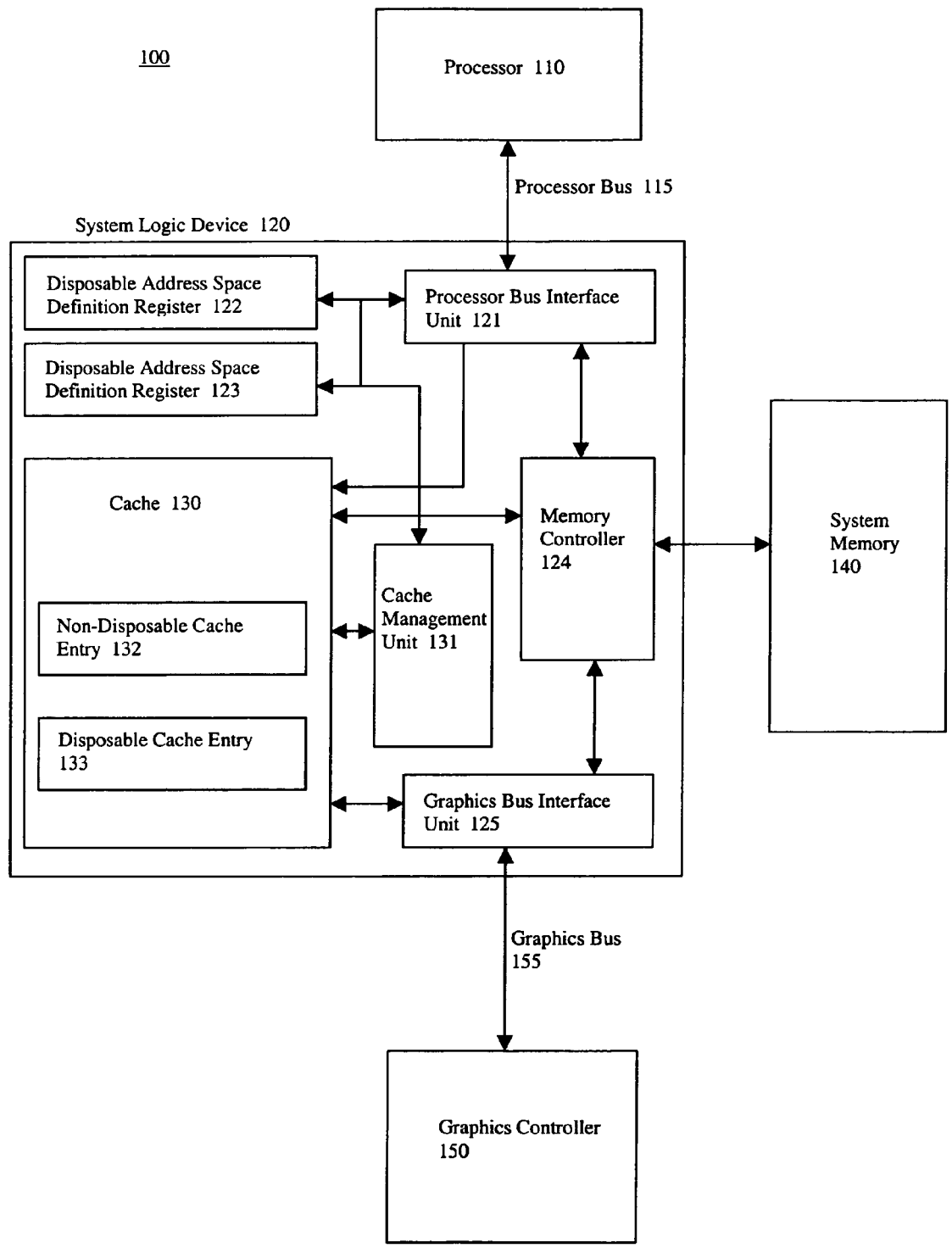
FIG. 1 is a block diagram of one embodiment of a system including a system logic device cache that stores disposable information.

FIG. 1 is a block diagram of a system 100 including an embodiment of a cache 130 embedded in a system logic device 120. The system logic device 120 is coupled to a processor 110 via a processor bus 115. The system logic device 120 is also coupled to a system memory 140 and a graphics controller 150. The graphics controller 150 is coupled to the system logic device 120 via a graphics bus 155. The graphics bus 155 may be an accelerated graphics port (AGP) bus or any other bus capable of coupling a graphics component to a system logic device.

The system logic device 120 includes a processor bus interface 121 that provides communication with the processor 110 over the processor bus 115. The system logic device 120 further includes a graphics bus interface unit 125 that provides communication with the graphics controller 150 over the graphics bus 155. The system logic device 120 asserts control over and communicates with the system memory 140 by way of a memory controller 124.

As previously mentioned, the system logic device 120 includes a cache 130. The cache 130 includes a number of entries. For this embodiment, each entry is capable of storing either disposable information or non-disposable information. A cache management unit 131 determines whether a particular entry contains disposable or non-disposable information. The cache size for this embodiment is approximately 64 kB, although embodiments are possible using other cache sizes.

For this discussion, the processor 110 is running a graphics driver that is sending a stream of command data to the graphics controller 150. The command data is delivered from the processor 110 to the system logic device 120 by way of the processor bus 115. The command data is received by the processor interface unit 121 and is placed in the cache 130. Included in the stream of command data is a segment of non-disposable information that is stored in a cache entry 132 (labeled as a non-disposable cache entry) and a segment of disposable information that is stored in a cache entry 133 (labeled as a disposable cache entry).

For this example embodiment, the cache management unit 131 determines whether a particular cache entry contains disposable data by comparing the address of that particular entry and with the addresses stored in a pair of disposable address space definition registers 122 and 123. The contents of these registers define a disposable information address space. Any information having a destination address that falls within the range of addresses defined by the definition registers 122 and 123 is assumed to be disposable by the cache management unit 131. Other embodiments are possible using a transaction attribute that is communicated along with the disposable information across the processor bus 115. The attribute may be stored with the disposable information in the cache and the cache management unit can observe the attribute to determine whether a cache entry contains disposable information.

The graphics driver running on the processor 110 is able to know whether a particular command will need to be read more than once. If that particular command does not need to be read more than once, then that command is designated as disposable. The "disposable" designation is communicated to the system logic device 120 via one of the techniques described previously.

Once the non-disposable and disposable commands are stored in the cache 130, the commands are available to be read by the graphics controller 150. After the graphics controller 150 has read the contents of the disposable cache entry 133, the cache management unit 131 may allow that entry to be overwritten by other data without first writing the disposable information to the system memory 140. On the other hand, before the cache management unit 131 allows the non-disposable cache entry 132 to be overwritten, the non-disposable information must be written out to the system memory 140 so that the non-disposable information remains available to the graphics device 150 or other system component.

Although there is no requirement that disposable information be written to the system memory 140, some embodiments may allow the system logic device 120 to write disposable information to the system memory 140 in order to make room for more data in the cache 130 when the processor 110 would otherwise need to wait for cache space to become available.

The discussion above in connection with FIG. 1 refers to a processor streaming command data to a graphics controller. However, other embodiments are possible where data streaming is occurring between other system components.

Figure 2:
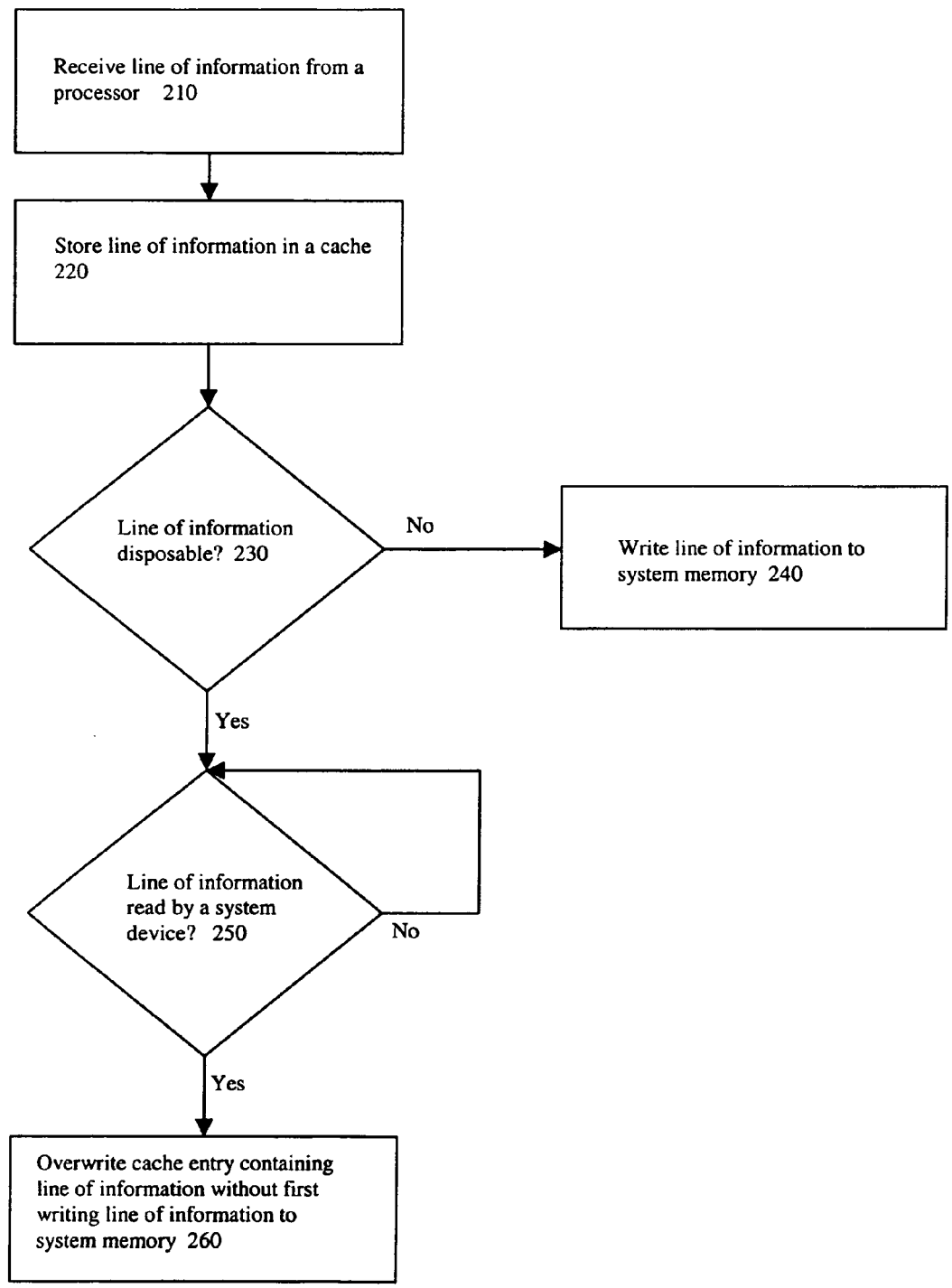
FIG. 2 is a flow diagram of one embodiment of a method for optimizing data streaming in a computer system utilizing random access memory in a system logic device.

FIG. 2 is a flow diagram of one embodiment of a method for optimizing data streaming in a computer system utilizing random access memory in a system logic device. At block 210, a line of information is received from a processor. The line of information is stored in a cache at block 220. At block 230, a determination is made as to whether the line of information is disposable. If the line of information is not disposable, then at block 240 the line of information is written to system memory. However, if the line of information is disposable, then a further determination is made at block 250 as to whether the line of information has been read by a system device. Once the line of information has been read by a system device, then at block 260 the cache entry containing the line of information is allowed to be overwritten without first writing the line of information to system memory.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

What is claimed is:

1. An apparatus comprising:
   a processor interface unit; and
   a cache to store information received from a processor coupled to the processor interface unit, the cache to store disposable information that may be overwritten without ever having delivered the disposable information to a system memory if the disposable information has been read at least once, the disposable information including a command, the processor interface unit to receive a disposable information attribute indication along with the disposable information from the processor, the disposable information attribute indication to indicate whether the command is to be read more than once.

2. The apparatus of claim 1, the cache to further store non-disposable information.

3. The apparatus of claim 2, further comprising a bus interface unit to allow a device coupled to the bus interface unit to access the cache.

4. The apparatus of claim 3, the cache management unit to allow the cache entry to be overwritten once the device coupled to the bus interface unit reads the cache entry and if the cache management logic determines that the cache entry contains disposable information.

5. The apparatus of claim 4, further comprising a system memory controller.

6. The apparatus of claim 5, the cache management unit to cause the cache entry contents to be delivered to the system memory controller for delivery to a system memory if the cache management unit determines that the cache entry does not contain disposable information.

7. A method, comprising:
   receiving a line of information from a processor, the line of information including a command;
   storing the line of information in a cache;
   determining whether the line of information is disposable by examining an attribute communicated along with the line of information by the processor, the attribute to indicate whether the command is to be read more than once; and
   overwriting the line of information, if the line of information is determined to be disposable, without ever having written the line of information to a system memory once the line of information has been read by a system device.

8. The method of claim 7, further comprising causing the line of information to be written to the system memory if the line of information is determined to be non-disposable.

9. The method of claim 7, wherein the system device comprises a graphics controller in a personal computer system.

\* \* \* \* \*